Patented Aug. 23, 1932

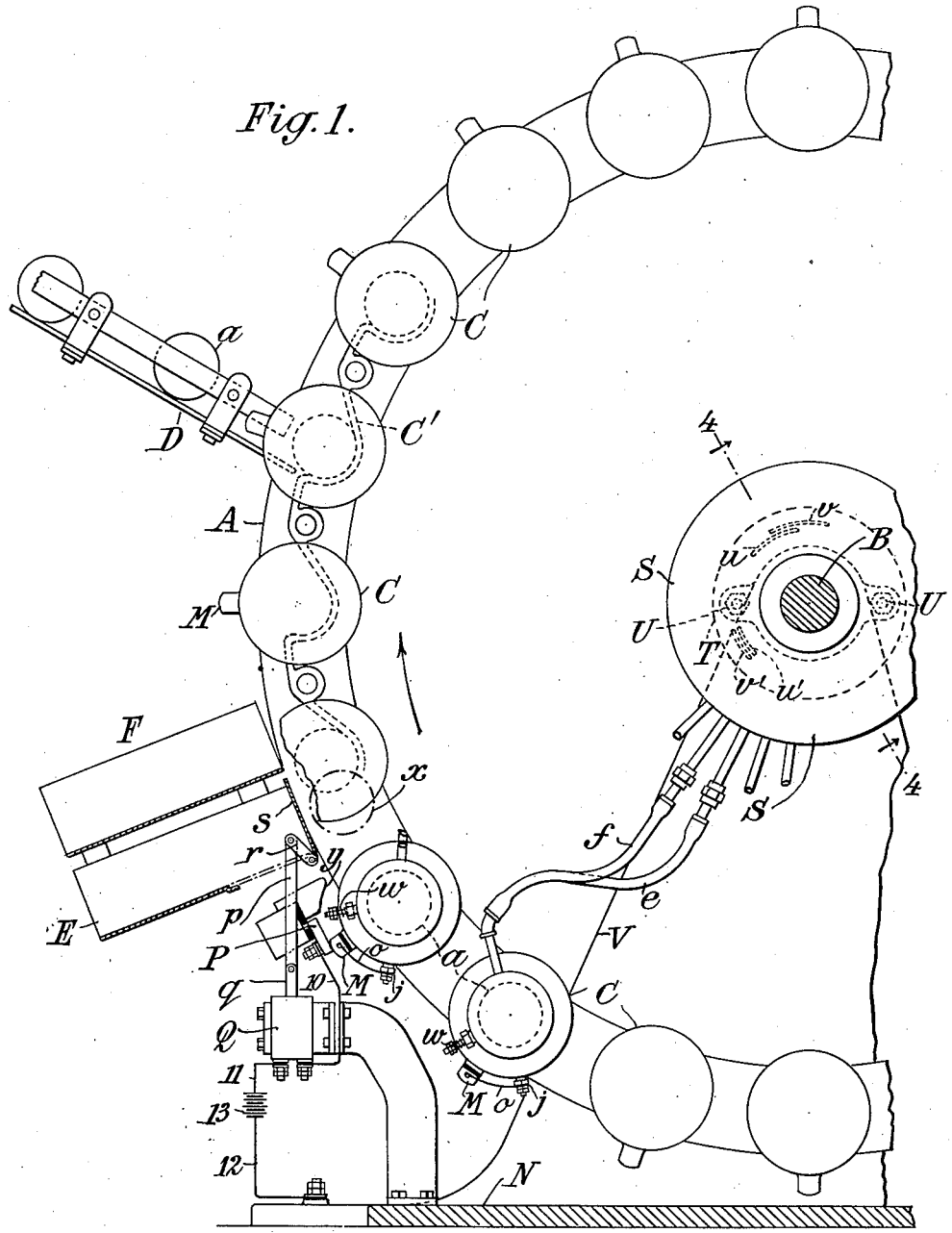

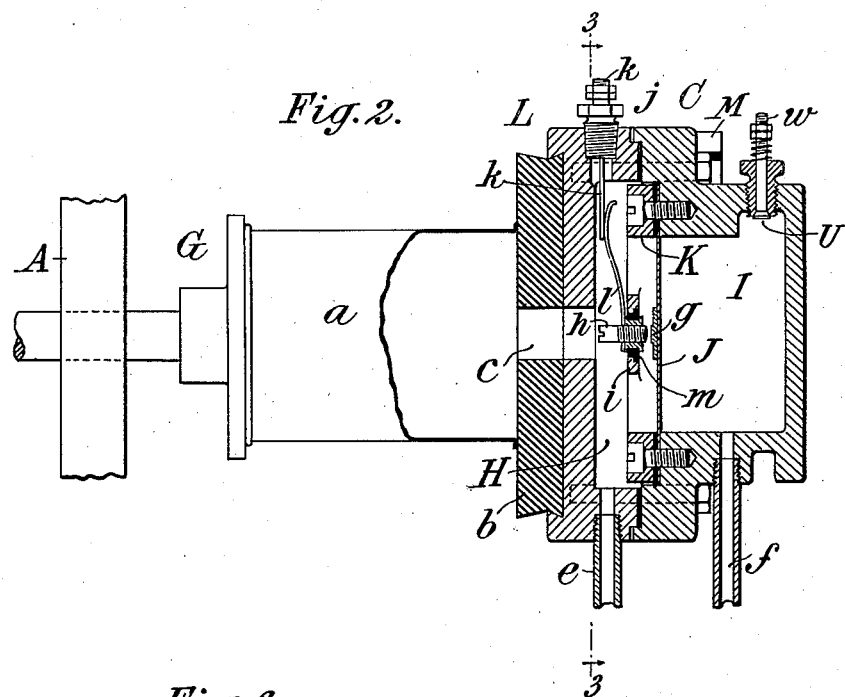
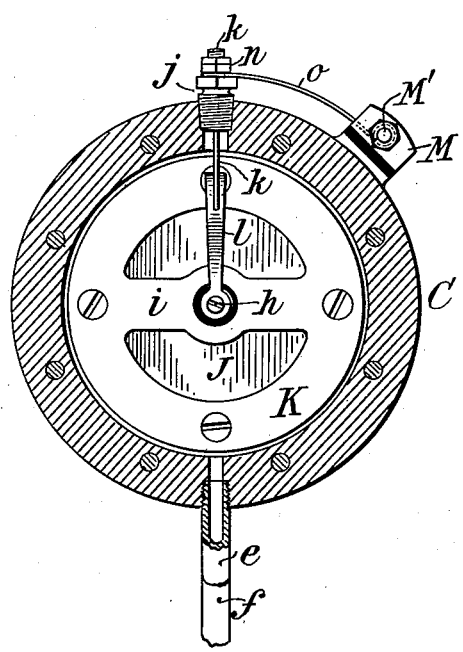

1,873,602

UNITED STATES PATENT OFFICE

PETER KRUSE, OF BROOKLYN, NEW YORK, ASSIGNOR TO E. W. BLISS COMPANY, OF NEW YORK, N. Y., A CORPORATION OF DELAWARE

CAN TESTING MACHINE

Application filed November 8, 1930. Serial No. 494,248.

This invention relates to machines for testing sheet metal cans or similar receptacles to discover defects causing leakage.

My Patent No. 779,719, dated January 10, 1905, sets forth a construction of can testing machine which may be taken as typical of such machines as heretofore constructed. In such machines the cans to be tested are run through the machine, which detects and preferably also ejects the leaky cans. The cans are pressed each against a yielding packing or gasket so that the interior of the can communicates with a chamber on one side of a flexible diaphragm, there being another chamber on the opposite side of this diaphragm. Air under equal pressure is introduced into both chambers and held sealed during a sufficient time to effect the tests. If during this time there is an interior leakage from the can, the pressure on that side of the diaphragm falls and the diaphragm is displaced; and this displacement is utilized to operate an indicator or an ejector which directs the defective can to a special outlet. The perfect cans are carried to another or normal delivery outlet.

According to the present invention the machine is rendered more sensitive and more rapid in operation, with the result that minute leaks which would have failed to operate the previous machines, are successfully detected. The machine consequently fills a need in canning factories for a rigorous and reliable test of the cans before they are filled, sealed and sterilized.

According to the present invention the same diaphragm (or other equivalent fluid pressure-responsive device) is used, receiving primarily equal pressure in the chambers on its opposite sides and yielding to the higher pressure in case of leakage; such yielding, instead of being caused through mechanical or pneumatic means to control the ejector, is made to operate an electric circuit which controls the energizing of an electromotive device such as a solenoid, which, in turn, operates the ejector. Suitable means are provided for introducing equal pressures to both chambers after the introduction of the successive cans; for then closing the openings thereto so as to seal the pressures therein; for establishing circuit connection with the diaphragm-controlled circuit closer at the proper time for operating the ejector; for thereafter releasing the pressures from the two chambers; and for releasing the cans just before they reach the ejector.

The accompanying drawings show the preferred embodiment of the invention in sufficient detail to enable those familiar with the preexisting machines to understand and apply the invention.

Fig. 1 is an elevation of the machine, the right hand half which involves a mere duplication of the testing devices shown being broken away.

Fig. 2 is a section on a larger scale through one of the testers, the plane of the section being coincident with the axis of the can being tested.

Fig. 3 is a transverse section on the line 3—3 in Fig. 2.

Figure 4:
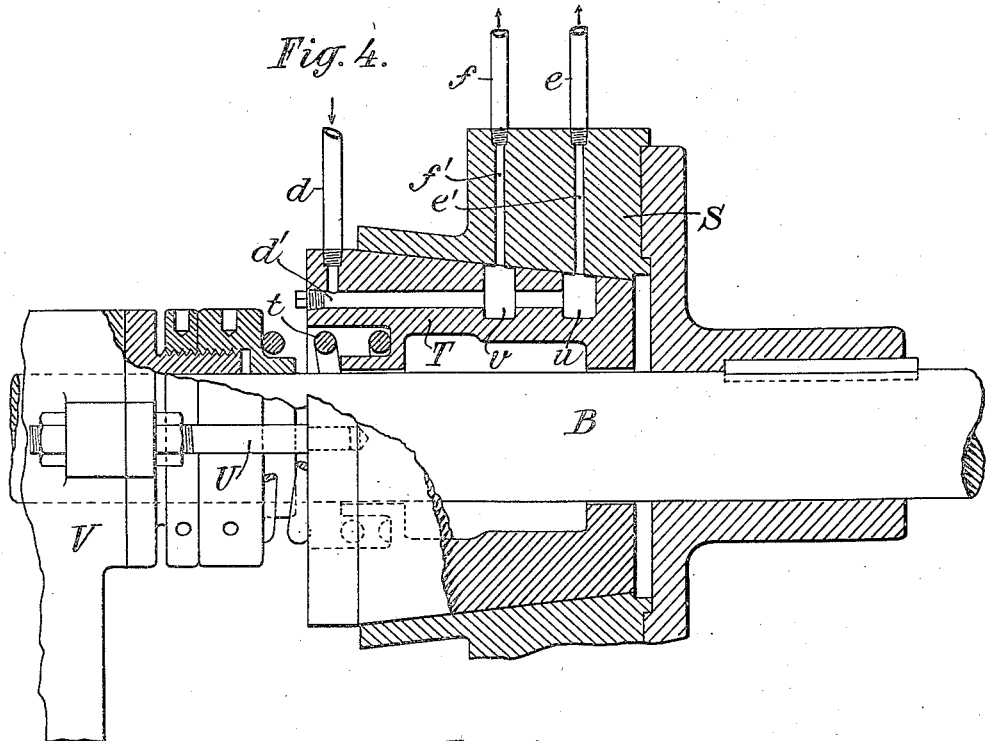
Fig. 4 is a section in the plane of the line 4—4 in Fig. 1, showing the valve for admitting air to and discharging it from the respective chambers.

It will be unnecessary to illustrate or describe the machine in minute detail except for the new features hereinafter set forth; in other respects it may be assumed that the construction is substantially that set forth in my said patent.

While in the following description the leak-detecting means will be described as controlling the operation of an ejector for the defective cans, it will be understood that it is equally within the invention to control therefrom the operation of an indicator.

Referring to the drawings, the machine comprises a rotating carrier wheel A having any suitable mounting upon a central shaft B and rotated at suitable speed by any driving means (not shown). The wheel A carries a succession of testers or testing heads C, C, one of which is shown in section in Figs. 2 and 3. These are mounted concentrically upon the wheel at any suitable spacing intervals; and the wheel is rotated continuously or intermittently to bring these heads successively into coincidence with the feeding-in chute D, a leaky can ejector s and discharge chute E and a perfect can discharge chute F. The wheel A also carries (as heretofore) a series of pressure pads G axially coincident with the heads C and adapted, upon the feeding-in of a can, to press it against the testing head and hold it in that position during nearly the entire revolution of the wheel, that is, until the can approaches the chute E. These pressure pads G are operated, as heretofore, to move against the bottom of the can at the feeding-in position and to back off and free the can at the ejector position. The relation of the parts is clearly shown in Fig. 2, where a is the can under test, having a closed bottom and open top, which latter is pressed by the pad G against the usual gasket b of yielding material, such as soft rubber. The interior of the can communicates through an opening c with the chamber H in the head, between which and the other chamber I is located the diaphragm J, as heretofore.

When the can has been thus seated in airtight manner against the testing head, a like fluid pressure (positive or negative) is established in both chambers H, I, so that the diaphragm J is in equilibrium. This is best done by admitting compressed air to both chambers either simultaneously or nearly so, it being preferable to time the admission so that the chamber H receives its air shortly in advance of the chamber I, because the capacity of chamber H includes that within the can, and it is needless to make the parts so large as to give the chamber I equal capacity. The air pressure admission preferably takes place through a central valve, best shown in Fig. 4, which receives air under pressure from an inlet pipe d and discharges it through tubes or conduits e, f (which may be of rubber hose) to the chambers H and I, respectively. This specific valve construction will be described later.

When the can under test leaks air, the pressure in chamber H falls and the predominant pressure in chamber I deflects the diaphragm, and this movement is utilized to control an electric circuit, preferably by closing the circuit. For this purpose the diaphragm carries a contact terminal g, which, upon a given movement, touches a contact terminal h which is conveniently supported upon a bridge piece i which may form part of the ring K which marginally clamps the diaphragm. To enable the ready separation of the parts of the head C, the circuit connection through its member L is conveniently made through an insulating plug j; the conductor k passing through this plug contacts internally with a conducting arm or spring l which is in metallic contact with the terminal h. For adjustment purposes the latter is made as a screw having threaded engagement with a metal sleeve held in an insulating bushing m in the bridge i. The plug j may be of the construction common in spark plugs, and the conducting pin j passing through it may be threaded exteriorly and receive nuts n by which a conducting strip or wire o is clamped to the pin. On the tester head C is mounted an insulated button M to which the other end of the metal connection o is fastened by a binding post M'. The circuit connection is completed, as shown in Fig. 1, where a wiper contact P is arranged to be rubbed by the button M in proper time, whereby if the circuit is closed between g, h, complete connection is made through an electromotive device Q, here shown as a solenoid. The circuit is completed by wires 10, 11, 12, through a battery 13 to the base N of the machine; and through the base and bearings (serving as a ground) to the respective test heads and thus to the diaphragm J of each head.

When the tester carrying a defective can approaches the contact P, its button M is in circuit connection with one pole of the battery, and upon touching the contact P it completes the circuit and energizes the solenoid, which draws down its core q, and through a link p operates an arm r on the axis of the ejector flap s of usual construction, thereby pulling it down from its upper position shown in full lines in Fig. 1, to the position shown in dotted lines, with the result that the defective can, on reaching the position shown in dotted lines at x, at which time it is released by the retraction of the pad G, is permitted to roll out through the chute E. If the can is perfect it has held the initial air pressure in the chamber H, the diaphragm has not been deflected, the circuit remains broken between g and h, and when the button M contacts with P the circuit is not closed and the ejector s remains in its normal position, so that the can is carried upward and discharged through the open chute F.

The particular circuit arrangements thus described, while convenient and desirable, are not essential to the invention and may be varied according to the choice of the designer.

Figure 5:
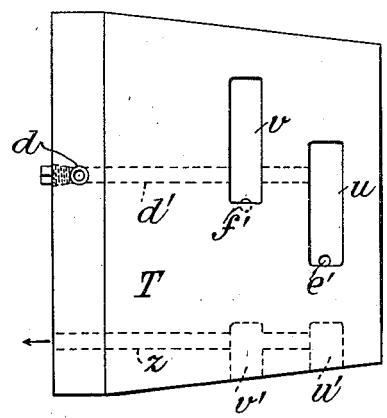
Fig. 5 is an elevation of the valve shown in Fig. 4, showing the valve ports.

Referring now to Figs. 4 and 5, the preferred valve construction will be described. The carrier wheel A which is mounted on the shaft B, has fastened to it an annulus S, through which are bored ducts or ports e', f', forming continuations of the conduits e, f, and angularly spaced according to the spacing of the heads C, C. Within this annulus is the valve T, which is stationary and has a duct d' forming a continuation of the inlet tube d and communicating with ports u, v. The port u is in the plane of the ports e', and the port v is in the plane of the ports f'. As the carrier wheel revolves, each pair of ports e', f' is brought in turn into communication with the ports $u$, $v$, whereupon compressed air flows through $d$, $d'$ and the respective ports and conduits into the chambers H, I. To charge the chamber H in advance of the chamber I the port $u$ is set somewhat in advance of the port $v$ relatively to the arrangement of the ports $e'$, $f'$. As these latter ports are conveniently staggered to give access to the connections, the ports $u$, $v$, are correspondingly displaced, as shown in Fig. 5. Two of the ports $e'$, $f'$ are shown in dotted lines in Fig. 5 in their relation to the ports $u$, $v$, at the instant of admitting air to the chambers; it will be seen that the port $e'$ has advanced further into communication with the port $u$ than has the port $f'$ with the port $v$, to insure that the chamber H shall be charged first.

For discharging the air from the chambers H, I, at the end of the operation (after the contact between M and P has been made), the valve T is provided with exhaust ports $u'$, $v'$, in line with the ports $u$, $v$, which ports communicate through a duct $z$ with the open air.

It is desirable to form the valve parts S and T as truncated cones, as shown, and to provide a spring $t$ to press the stationary valve member T into close sliding engagement with the revolving annular member S. The member T may be a segment or it may be extended circumferentially to form the frustum of a cone. The valve is held stationary by fixed pins U, fastened to a bearing frame V.

In some cases it is desirable to relieve the pressure in the chamber I immediately after the operation of the solenoid Q and before the discharge of the air by the operation of the valve T. For this purpose a relief valve U is shown in Fig. 2, its stem $w$ projecting outwardly, and in the rotary movement coming in contact with a fixed cam $y$ (Fig. 1) whereby the stem is pressed in and the valve opened to discharge air from the chamber I.

The machine is provided at each testing head with any suitable means for properly centering the can which is fed to it from the inlet chute D. The means shown in dotted lines at C' are the same as illustrated in Fig. 5 of my said patent.

A machine constructed according to the present invention has the important advantage that the leak detector involves no operation of mechanical parts, with their attendant friction or inertia, nor any operation of pneumatic or other pressure-operated parts which by reason of unbalanced pressures or the like are liable to interpose a variable resistance to operation. Instead, the difference in pressures is required to operate only the diaphragm, which carries with it merely a light contact piece. The result is that the machine is rendered far more sensitive than heretofore to minute leaks and may operate with a lower pressure of air or other fluid, and is capable, with equal accuracy, of operating at much higher speed than heretofore.

The invention is susceptible of considerable modification or variance according to the kind or type of can to be tested and the requirements of speed, space and the like in any given case. It will be understood that the fluid pressure may be negative pressure or suction, if preferred; also that the operation may be performed by either closing the electric circuit or breaking it, these being equivalent means; further, the electromotive means for operating the ejector may be either directly or indirectly connected to the latter and may operate it either by directly transmitting the energy imposed electrically upon the electromotive device, or through the intermediation of any other energizing means, the essential thing being that when the electromotive device is influenced by the circuit control corresponding to the presence of a leaky can, the ejector shall be operated to discharge that can from the machine, such operation being omitted in the case of a sound or perfect can.

It will be understood that the movable part $s$ operated under control of the electric circuit, may be either the working part of an ejector, or it may be any other device, such as an indicator.

What I claim is:

1. In a can testing machine comprising a detector, including a pressure-actuated part connected to respond to leakage from the can, the combination therewith of an electric circuit having two breaks, a circuit closer controlling said circuit operated by the detector to close one of said breaks, and circuit closing means located at a fixed point to close the other break, an ejector, and an electromotive device in said circuit operating said ejector.

2. In a can testing machine comprising a detector including a testing head containing two chambers, one of which in action has airtight communication with the interior of the can to be tested, a diaphragm separating said chambers, circuit-controlling contacts operated by the diaphragm, a contact button carried by the head, a stationary contact, an electric circuit including said contacts, an electromotive device in said circuit, and a can ejector operated by said electromotive device.

3. In a can testing machine comprising a pressure-actuated part connected to respond to leakage from the can, and an ejector, the combination therewith of an electromotive device connected to operate the ejector, an electric circuit and circuit control means, one operated by the pressure-actuated part and the other synchronized to operate at the time required for initiating the ejecting operation.

4. In a can testing machine comprising a revolving carrier, a series of testing heads carried thereby, each head including a pressure-actuated part connected to respond to leakage from a can, and an ejector, the combination therewith of an electromotive device adapted to operate the ejector, and an electric circuit having control means, the one operated by said pressure-actuated part, and the other synchronized to operate in the position of the respective heads for initiating the operation of the ejector.

5. A can testing machine comprising a rotary carrier, a testing head carried thereby, said head including a pressure-actuated part connected to respond to leakage from the can, circuit contacts operated by said pressure-actuated part, a contact button carried by the head, an ejector, an electromotive device controlling the operation of said ejector, a stationary contact in position to be touched by said button when the head reaches the point where the ejector for discharging a defective can should be operated, and an electric circuit controlled by said respective contacts and energizing said electromotive device.

6. A can testing machine comprising a revolving wheel, pressure heads carried thereby, each head comprising two chambers and an intervening diaphragm, an ejector controlled from such diaphragms, and means for charging said chambers with fluid under pressure, comprising a valve having fixed and movable members, the movable member having ports communicating with the respective chambers and the fixed member having connection with a source of pressure, and ports adapted to register successively with the respective ports of said movable member, and means for discharging the fluid pressure from said chambers.

7. A can testing machine comprising a revolving carrier, a series of testing heads carried thereby, each head comprising two chambers and an intervening diaphragm, an electric circuit closer connected to the diaphragm to be operated in response to leakage from a can, an electrically-operated ejector, an electric circuit arranged to be closed upon the arrival of a head at the ejecting position when said circuit closer is closed, a source of fluid under pressure, and a valve having fixed and movable members, the movable member having ports communicating with the respective chambers and the fixed member having ports adapted to register successively with the respective ports of the movable member.

In witness whereof, I have hereunto signed my name.

PETER KRUSE.